United States Patent [19]

Richburg et al.

[11] Patent Number: 5,213,541
[45] Date of Patent: May 25, 1993

[54] DRIVE COUPLING, AND IDLER BEARING APPARATUS FOR MEAT DEBONING MACHINE ASSEMBLY

[75] Inventors: James B. Richburg, 101 Pumpkin La., Sumter, S.C. 29150; Samuel M. Brice, St. Matthews, S.C.

[73] Assignee: James B. Richburg, Sumter, S.C.

[21] Appl. No.: 694,548

[22] Filed: May 2, 1991

[51] Int. Cl.$^5$ .................. B02C 19/22; A22C 17/00
[52] U.S. Cl. .................... 452/135; 452/138; 426/55; 241/74
[58] Field of Search .............. 452/135, 94, 139, 138; 241/74, 82.3, 24; 426/55

[56] References Cited

U.S. PATENT DOCUMENTS

| | | | |
|---|---|---|---|
| Re. 32,060 | 12/1985 | McFarland | 452/138 |
| 4,025,001 | 5/1977 | Yarem et al. | 452/138 |
| 4,042,176 | 8/1977 | Beck et al. | 452/138 |
| 4,685,626 | 8/1987 | Kerdiles et al. | 452/138 |

Primary Examiner—Willis Little
Attorney, Agent, or Firm—Cort Flint

[57] ABSTRACT

An improved motor coupling and bearing housing are disclosed for a meat deboning machine and the like wherein the motor coupling includes an axially fixed coupling between a drive motor shaft and an auger which accommodates axial movement during thermal expansion to reduce bearing and other parts failure, and allow the drive motor to operate at its magnetic center. A thrust bearing operates between the coupling and is pre-loaded by a biasing force exerted between the coupling and the drive motor shaft which also loads the coupling as it floats over the drive motor shaft. A twist lock connection is made between the coupling and the auger which allows for quick assembly and disassembly while maintaining a good drive connection. An idler housing in conjunction with the motor coupling accommodates thermal expansion of the auger clearance in the motor coupling accommodates small amounts of angular misalignment without placing large forces on the bearings.

40 Claims, 3 Drawing Sheets

DRIVE COUPLING, AND IDLER BEARING APPARATUS FOR MEAT DEBONING MACHINE ASSEMBLY

BACKGROUND OF THE INVENTION

The invention is directed to an improved drive coupling and bearing housing for a meat deboning machine and the like.

Experience has shown that bearing life in machines of the type generally shown in U.S. Pat. No. 4,516,731, May 14, 1985, may be quite short. In several instances, the thrust bearing assembly has not lasted an hour. In some cases, the motor bearings last about 1000 hours or less, and rarely do they last a year. The auger support bearing next to the motor usually is changed before it has 300 hours of service. Additionally, the 450° F. drip point grease recommended by the manufacturer drips when the machine is operated according to the instructions.

A review of the assembly reveals that the whole machine is referenced to the C-face of the motor. The auger is supported on the exit end by a motor end coupling attached rigidly to the motor shaft by a bolt and supported by a ball bearing housed in a compression ring support assembly which is bolted to the face of the plate. On the inlet end, the auger is supported by a thrust bearing assembly which in turn is supported by a pair of arms which extend from a plate bolted to the C-face of the motor. This arrangement forms a rigid cage for the rotating elements.

Due to the design, it is not likely for the bearings to have adequate service life because all dimensions relating to bearing linear placement and alignment must be nearly perfect, independent of operating temperature, torque, and thrust, and because the rotating elements are rigidly coupled together with no ability for the auger to float axially, independent of the motor. Further, no provision is made for thermal expansion or internal wear of bearings.

There are critical fits and dimensions in this machine which pertain to alignment and bearing life. The fit between the shaft and shoulder on the inlet end of the auger and the spinner plate or flange auger support is critical. The length between the point of the motor shaft coupling touching the end of the motor shaft and the auger inlet end shoulder touching the spinner plate is critical. This requires that 1) the length between the auger shoulder touching the spinner plate and the auger shoulder touching the shoulder of the motor end shaft coupling be correct, and 2) the dimension from the shoulder of the motor shaft coupling touching the auger shoulder and its point of contact with the end of the motor shaft be correct. The length of the arms supporting the thrust bearing assembly from the front of the plate to the point of contact with the feed can is critical. The thickness of the feed can flange and the depth of the thrust bearing housing from the flange face to its inside end which contacts the thrust bearing support ring are critical. The thickness of the thrust bearing and the thickness of the flange of the spinner plate are critical. The thickness of the mounting plate and the length of the motor shaft from the front of the C-face after it has been cut off by the manufacturer, and the concentricity of the motor coupling bearing housing when fastened are critical. The radial placement of the thrust bearing support arms with respect to the motor C-face, and the concentricity of the thrust bearing housing when fastened are critical.

Depending on how well these critical fits are achieved, different scenarios, each leading to shortened bearing lift, present themselves. In the case where the alignment and fits are good, the auger shoulder transmits thrust to the spinner plate which in turn transmits the thrust to the thrust bearing causing its rollers to turn and to transmit the thrust to the thrust housing which reacts with the support arms and base plate bolted to the C-face of the motor. According to the bearing manufacturer, this bearing is being operated at unsuitably high speeds. As a result the bearing heats up and fails prematurely.

In some instances, users of the machine direct a stream of water on the bearing housing to remove heat, but the bearing still fails prematurely. Following the machine manufacturer's suggestion to add more grease when the temperature rises does not help because this causes the temperature to rise more due to over-lubrication. It has been found that changing the thrust bearing housing to a different design with different bearings has helped achieve longer thrust bearing life, but other bearing problems due to rigid configuration still exist.

When the critical fits, dimensions, and alignment are not perfect, several things can happen depending on how much error exists. If any combination of lengths and thickness allow there to be excessive pressure created on the thrust bearing when the machine is put together for service, the previous scenario repeats itself rapidly. Unfortunately, there is no provision in the machine for floating the auger and pre-loading the thrust bearing so there is no way to control how much pressure is placed on the thrust bearing when the machine is assembled. Additionally, no provision has been made for thermal expansion. In the typical machine, a 150° F. temperature rise can produce a length change of almost 1/16" which is sufficient to produce a great thrust in this configuration. The support arms remain at ambient temperature and do not expand, thus causing this problem.

If any combination of fits, dimensions, and alignment allow the shoulder of the auger not to touch the spinner plate and fail to transmit thrust, the thrust bearing will last longer because the rollers are not turning under load and do not heat up as badly as in the previous scenario. (It is possible that the thrust bearing rollers may not turn at all because there is no method to assure a pre-load.) In U.S. Pat. No. 4,516,731 pin 74 is used to keep the ball bearing 78 and the thrust bearing turning so the spinner plate will not gall to the end of the auger. The thrust causes the motor bearings to wear and allow the motor to be pulled off magnetic center causing the auger to move toward the entry end, thus opening the compression ring which causes yield to drop. Depending on the degree of bearing wear, tightening the compression ring is risky because when the motor is unloaded it floats back to its normal operating point at magnetic center and there may be metal to metal contact with the auger and compression ring when this happens. When the motor is pulled off magnetic center, current increases and leads to motor heating.

Depending on the wear of the motor bearings, fits and dimensions, it may become possible for the load to be transmitted to the thrust bearing at some advanced stage of motor bearing wear, thus causing the thrust bearing to fail before the motor bearings fail completely. This holds the potential for several thrust bearing failures before the motor bearings finally fail. As the motor bearings deteriorate, the axial thrust load is being borne by them, but the radial load is being borne by the auger exit end support bearing. The radial load causes this bearing to fail prematurely.

A major problem with this prior art machine is that the support arms, auger, thrust bearing assembly and feed can are cantilevered and cannot be aligned any better than the back plate and support arms allow. The framework constituting the cage for the rotating elements is not strong enough to prevent deflection under load. Further, the whole cage framework is referenced to the C-face of the motor which is not necessarily perfectly perpendicular to the motor shaft. This means that even if the support arms were able to be perfectly square to the back plate and not defect, that the items supported by them will not necessarily be aligned to the motor shaft.

Keeping the auger in line with the center of the screen and feed can requires that the end of the auger be supported by two self aligning bearings in the idler bearing housing. The problem is that for the auger to be aligned with the center of the feed can and screen, it must be out of alignment with the motor shaft if there is any error in the framework or motor C face orientation. Coupling the auger to the motor shaft eliminates skew and parallel misalignment but does not eliminate angular misalignment.

Accordingly, an important object of the present invention is to provide an improved drive coupling for an auger of a meat deboning machine which eliminates the above described problems.

Another object of the invention is to provide an improved idler bearing assembly for the auger of a meat deboning machine.

SUMMARY OF THE INVENTION

In accordance with the invention, an improved bearing arrangement is provided which eliminates the rigidly bolted motor shaft coupling and above problems. This is accomplished by placing a thrust bearing on a fixed motor shaft coupling which allows a drive motor shaft to float axially with respect to the coupling, and spring loading the thrust bearing via the motor shaft and coupling for pre-loading. A pin and spiral groove connect the auger to the motor shaft coupling. The thrust bearing assembly is replaced with two self aligning double row ball bearings and multiple seals in a removable housing at the rear of the feed can. The result of making these changes is that several benefits will be gained in manufacturing the parts for the machine, assembling and disassembling the machine, personnel safety, and machine component life.

The motor shaft coupling is held against the thrust bearing inner race by spring, pneumatic or hydraulic pressure when there is no load and during start-up. When loaded, the auger thrust assists in maintaining it against the thrust bearing.

A benefit of having the thrust bearing at the exit end of the auger is that the motor bearing can be used to support the radial load thus allowing a larger choice of thrust bearing types to be used. Another benefit is that the spring pre-loading device in the motor shaft coupling can take advantage of the threaded hole in the end of the motor shaft on existing machines to adjust the amount of pre-load by simply adjusting the position of a set screw threaded into the hole relative to the end of the shaft.

The motor shaft coupling allows thermal expansion to take place in the motor shaft and relative axial movement without affecting the load on the thrust bearing. Manufacturing tolerances and thermal expansion in all the parts associated with the machine's length are compensated for by the idler bearing assembly. This means that there cannot be a condition which allows the thrust bearing to be pre-loaded to an uncontrolled degree, thus assuring normal bearing life.

Because the motor shaft is allowed to float with respect to the motor shaft coupling, the motor bearings will not be required to accommodate auger thrust under any circumstance so normal motor bearing life will be attained. Additionally, the motor cannot be pulled off magnetic center so it will not be subjected to the excessive motor currents produced by this condition, and motor heating will be reduced thus improving its insulation life.

When hydraulic pressure is sued to pre-load the bearing, the end of the motor coupling is filled with grease through a fitting on the end of the motor coupling. Pressure relief is obtained by a small opening in the end of the coupling. The coupling is advantageously greased daily preventing wear. Pneumatic pre-loading may be done safely using nitrogen in the cavity of the motor shaft coupling, but this is rather difficult to achieve compared to the other methods.

It may even be possible to use a fixed rod or spring between the end of the motor shaft and the inside end of hole in the motor coupling and control the rod length to push the motor slightly off magnetic center at standstill. This would allow the motor to pre-load the bearing, but temperature expansion and machine tolerances would possibly come into play again.

Eliminating the thrust housing assembly helps improve alignment by removing over 50 pounds of weight cantilevered on the arms. In addition to removing the weight, the idler bearing housing assembly which bolts to the rear of the feed can will run cool. This removes the danger of the operator being burned by the thrust housing and prevents heat from entering the product being processed.

In the plate at the end of the feed can a hole is placed to allow the shaft to extend into the idler bearing housing. This housing has four seals (one or more) which are used to prevent product from entering the housing to prevent product leakage to atmosphere and from contaminating the bearings. Sealed self aligning double ball bearings are used to place the centerline of the auger shaft on the centerline of the feed can and the centerline of the motor. Because the mounting plate, support arms and feed can plate form a rigid cage for the rotating elements, the centerline of the motor and centerline of the auger shaft are identical. In the event of minor dimensional errors in the machine framework the error will appear only as an angular misalignment between the auger and motor coupling. This error will not affect the position of the auger with respect to the centerline of the feed can and screen, but will appear as radial load on the thrust bearing and idler bearings.

The entry end alignment is assured by using an appropriate alignment method, either tapered bores and OD's, dowel pins, or other fits. The cartridge will have a flange which bolts to the rear of the feed can. On the same bolt hole circle will be two dowel pins to keep the unit in place. The rear of the cartridge will be covered by a plate to keep out moisture and debris.

The time required to assemble and disassemble the machine will be reduced. The feed can auger support cartridge will slip off and on easily and quickly, and the auger will be easily twisted off the pins in the motor shaft coupling. The operator will not have to contend with removing the very hot and heavy thrust housing found on current machines, nor will he have to wrestle with unscrewing the auger.

The auger will be held on the motor shaft coupling by a dowel pin extending radially through the coupling. The auger will have two recessed spiral slots machined radially in the auger to accommodate the ends of the dowel pins. When the auger is pushed onto the coupling, the dowel pins will fit in a widened portion of the slots at the end of the auger, making it easy for the operator to position the auger with respect to the pins. When the auger is pushed about an inch toward the motor, the pins will encounter a spirally machined portion of the slots. The operator will twist the auger to seat it, and the pins will bottom out at the end of the spiral portion of the slots about an inch from the end of the auger. At that point there is a groove machined parallel to the end of the auger to accommodate the pins. The groove is oversized to allow movement of the pins if misalignment exists. The direction of motion of the motor and the torque will keep the pins at the end of the grooves in the auger. The end of the coupling will fit inside the hole in the end of the auger which is oversized to allow angular misalignment without creating large forces on the bearings. There will be room inside the auger to accommodate the fittings on the motor shaft coupling without touching. Likewise, the end of the auger will not touch any surface.

No machine work will be required to convert existing machines to the new system. A secondary benefit is that the user can convert his machine to the new parts without removing the ability to use his existing parts should he desire to do so.

In order to further alleviate the alignment problems existing in the prior art, the parts for the machine are mounted on a rigid base with alignment means supporting the thrust bearing housing and motor coupling assembly as well as the feed can and screen. With this arrangement, placing the motor on the frame is optional as long as the thrust bearing is pre-loaded. If the motor is placed elsewhere, the auger may be driven or pre-loaded from either end. If the motor is placed o the frame, it then becomes practical to align the motor shaft with the centerline of the feed can and screen and eliminate the last major alignment problem.

DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
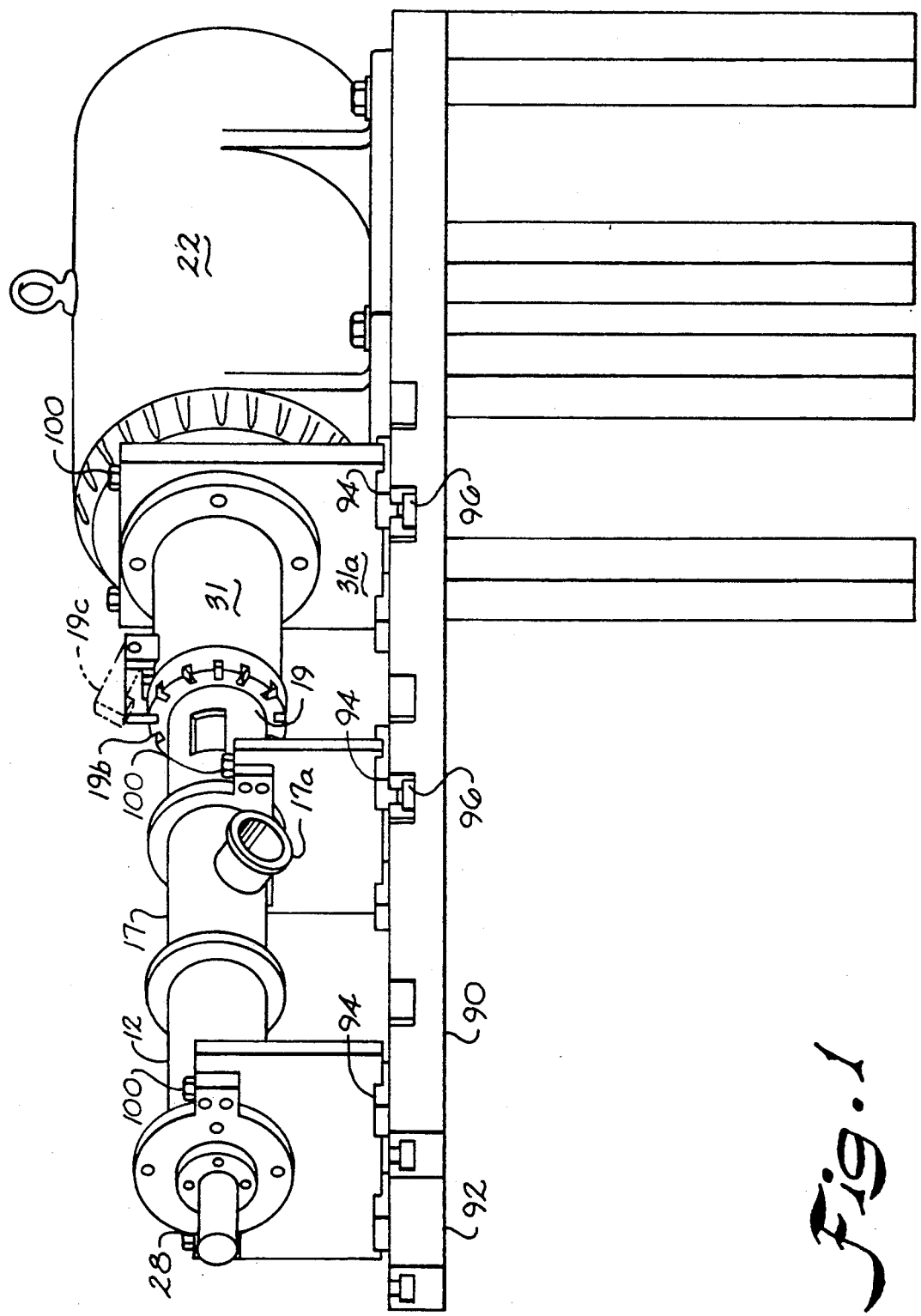
FIG. 1 is a perspective view of a meat deboning machine constructed according to the invention.

Referring now in more detail to the drawings, a meat deboning apparatus, designated generally as 10, is illustrated of the type which includes a feed can 12 having an entry end 14, a perforated meat deboning sieve 16 through which meat product passes generally radially for separation from bone material, and is collected in a manifold 17 having an outlet 17a, and an exit end 18 from which the bone material exits. An auger 20 conveys the meat and bone material from the entry end to the exit end. A drive motor 22 is connected to a first end 24 of the auger for rotating the auger. A bearing housing 36 supports an auger shaft 28 at a second end 30 of the auger. A more detailed description of a typical deboning machine of this type may be had by reference to U.S. Pat. No. 4,516,731 incorporated by reference.

There is a throttle valve ring 19, in which exit opening 18 is formed, which is threaded into a motor coupling housing 31. Valve ring 19 is threaded in and out to vary a gap 19a through which the bone material passes. The size of gap 19 controls the size of bone material and, to some extent, back pressure along the auger. As can best be seen in FIG. 1, a lock ring 19b and latch 19c lock the valve ring at a desired gap position.

Figure 2:
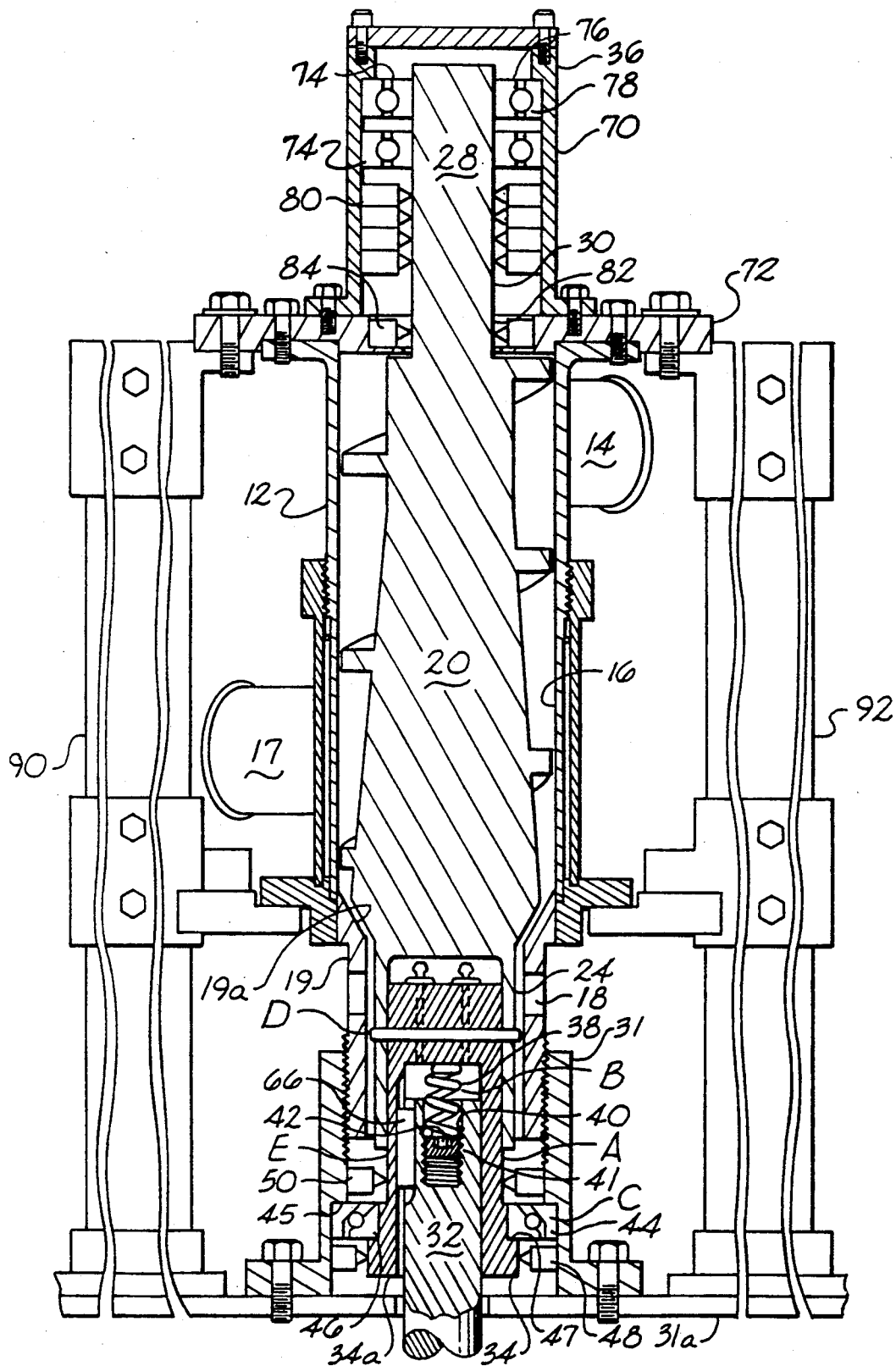
FIG. 2 is a top plan view with parts cut in sections illustrating meat deboning apparatus having a motor coupling and bearing housing according to the invention.
Figure 3:
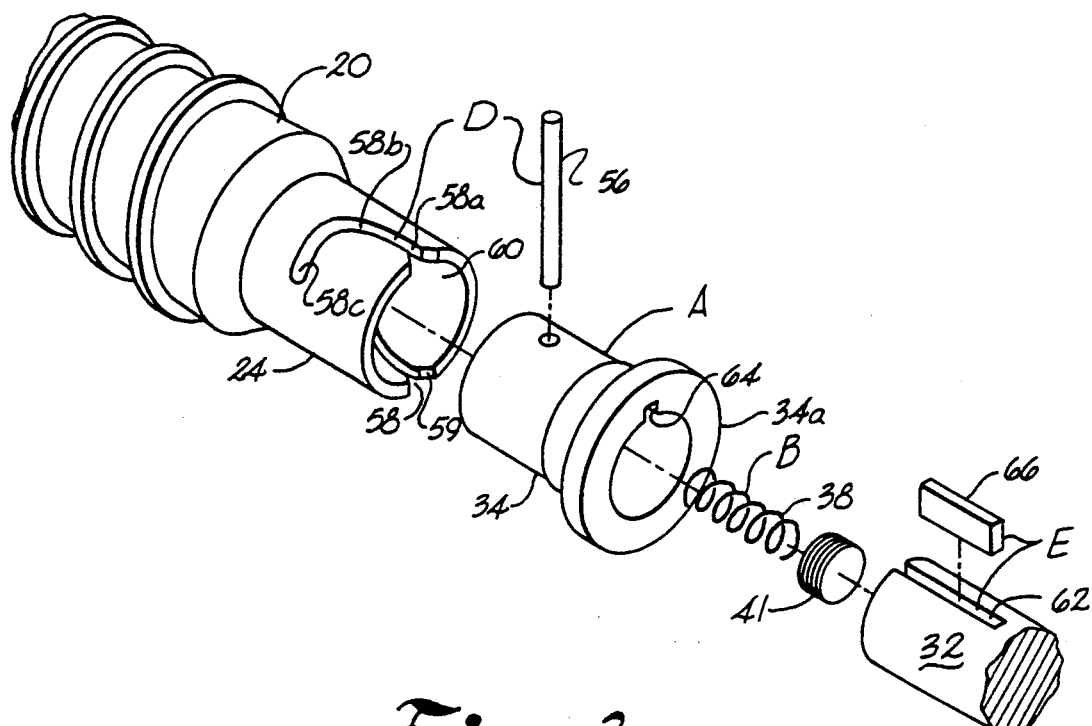
FIG. 3 is a perspective view of parts separated illustrating an axially movable motor coupling for a meat deboning apparatus according to the invention; an FIG. 4 is a perspective view illustrating T-bar assemblies for mounting a meat deboning machine to a frame according to the invention.
Figure 4:
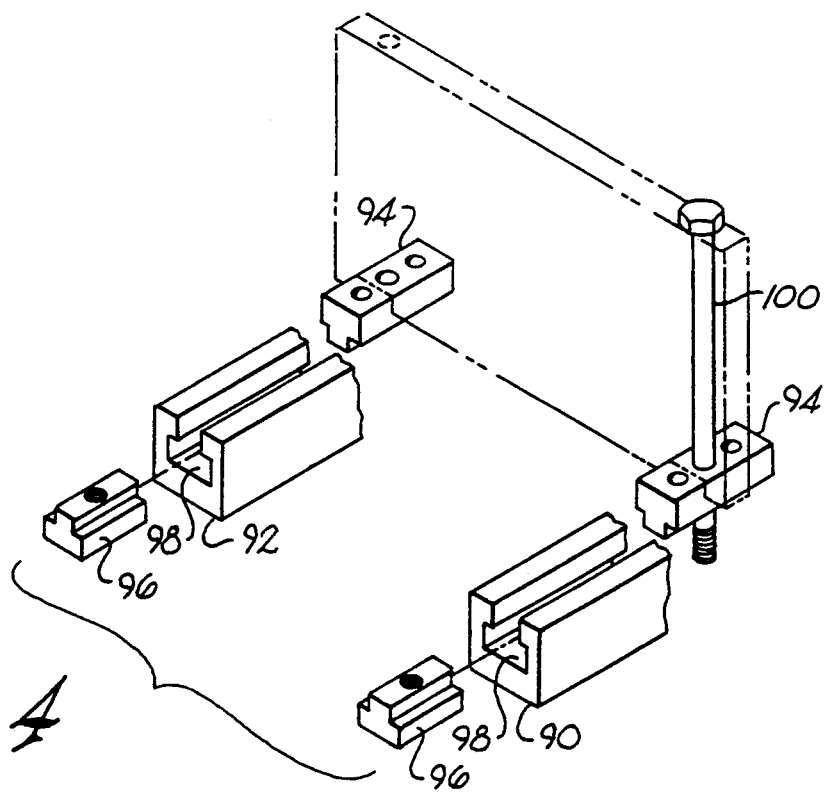

A motor coupling housing 31, carried by a motor mount plate 31a, receives first end 24 of auger 20. Axially fixed coupling means A couples a drive motor shaft 32 and auger 20 together in a manner that accommodates axial movement of the drive motor shaft and auger relative to each other. Coupling means A includes a coupling element 34 having a hollow interior which receives motor shaft 32 so that the drive motor shaft floats axially inside the coupling element. Biasing means B is carried between coupling element 34 and drive motor shaft 32 urging the drive shaft motor away from the coupling element. Biasing means B includes a compression spring 38 received in a bore 40 of motor shaft 32. Adjustment means for the spring force is provided by threading bore 40 in the end of drive motor shaft 32, and disposing an adjustable follower 41 threadably received in bore 40 which engages one end of spring 38. The follower is manually operated and includes a drive socket 42 in the form of an allen wrench slot (FIG. 2).

A thrust bearing C is carried by the coupling element means A and includes an outer race 44 carried by a shoulder 45 in the motor coupling housing 31, and an inner race 46 carried by a shoulder 47 of the coupling element 34. This fixes coupling element 34 in the housing 31 and allows shaft 32 to float or move axially inside the coupling element. A first seal 48 is carried between the motor coupling housing and the coupling element on a first side of thrust bearing C. A second seal 50 is carried between the motor coupling housing and coupling element on a second side of said thrust bearing. Biasing means B spring loads thrust bearing C via said coupling element 34 for pre-loading of said thrust bearing. For this purpose, coupling element 34 includes a flange 34a which abuts bearing C and is urged against bearing race 46 in a direction away from drive motor 22 for pre-loading.

A first connecting means D connects coupling means A to auger 20. As can best be seen in FIG. 2, first connection means D includes a non-threaded twist lock connection means for locking the auger and drive motor shaft together in a drive connection with a twisting force in a first direction, and for releasing the drive motor shaft and auger from the drive connection with a twisting force in an opposite direction. The twist lock includes a connecting pin 56 carried by the coupling element, and spiral grooves 58 formed in the second end of the auger which receives the connecting pin and twists into locking connection with the pin and the coupling element. Spiral grooves 58 each include a generally straight groove portion 58a, a curved groove portion 58b, and a terminal groove portion 58c which is generally parallel to the front of the auger. There is a tapered groove opening 59 leading into straight groove portion 58a. The first end of the auger includes a hollow bore 60 and the coupling element slides within the bore.

A second connecting means E connects drive motor shaft 32 and coupling means A. As can best be seen in FIG. 2, second connecting means E includes a slidable connector means for connecting the motor drive shaft and the coupling element together in a manner that the motor drive shaft and the coupling element may slide relative to each other. The slide connection includes a first keyway 62 formed in drive motor shaft 32, and a second keyway 64 formed in coupling element 34. A key 66 interconnects the first and second keyways.

A bearing housing 70 is carried by an end plate 72 of feed can 12 which receives the first end of auger shaft 20. Bearing housing 70 includes at least one self aligning bearing 74 having an inner race 76 surrounding the auger shaft and an outer race 78 surrounded by the bearing housing. Preferably, there are a plurality of self aligning ball bearings. Sealing means 80 is disposed between bearings 74 and feed can end plate 72 which may include a plurality of neoprene coated seals. An opening 82 is formed in said end plate for receiving said auger shaft in said opening. Means for attaching said bearing housing to said end plate may include a plurality of dowel pins and holes for aligning said bearing housing on said end plate of said feed can.

As can best be seen in FIG. 1, motor 22 is attached directly to the frame rails 90, 92, and the working parts are supported at the correct height above the frame by slidably mounted block assemblies 94 equipped with T-blocks 96 which fit into T-slots 98 machined into the rails. The T-blocks are bonded and bolted to the blocks by bolts 100 to prevent the accumulation of bacteria. The frame size of the motor determines the width of the frame since the frame bolts directly to the motor feet. If a smaller motor is used, the feet will be closer together and the shaft centerline will be closer to the feet. It is a simple matter to accommodate a smaller frame size by placing cross members of the correct thickness across the frame and bolting the motor feet to the cross members.

Another possible embodiment would be to mount the motor on the frame rails and to extend another portion of the frame rails below the motor so that the sliding blocks and working parts can be mounted in a cantilevered manner on the underside of the upper frame rails in line with the centerline of the motor (not shown). This configuration would have the advantage of letting the product fall freely from the screen without passing or touching the frame. It would be more sanitary and easier to configure the necessary piping or conveyances to handle the product although it may be a bit more inconvenient to assemble and disassemble.

Another possible configuration similar to that described above would be to extend the raised portion of the frame parallel to the motor centerline and machine the T-slots in the frame on the inside of the frame. In this configuration, each side of each mounted working part could be supported by its own mounting block. Or, better yet, each mountable part can be extended on each side and equipped with its own T-bar bolted and bonded to its extensions.

Thus, it can be seen that an advantageous construction for a motor drive coupling and idler bearing for an auger in a meat deboning machine and the like can be had according to the invention. The placement of the thrust bearing next to the motor and in the same assembly as the ring valve causes arms 90, 92 supporting the feed can, screen, and idler bearing assembly to be unloaded from a major component of thrust felt in the prior art machines referred to in the background.

The component of thrust generated when the exiting bone attempts to widen the gap between the ring valve and auger causes the auger to pull against the pin in the coupling which in turn transmits the thrust to the inner race of the thrust bearing. The force is transmitted to the outer race via the rotating elements between the races and the outer race pulls on the shoulder in the bearing housing. The reaction thrust felt by the ring valve causes the ring valve to transmit its force to the bearing housing via its threads and cancel the thrust applied at the shoulder. Thus it can be seen that the arms are not loaded by the afore-mentioned component of thrust.

In the prior art machines illustrated in U.S. Pat. No. 4,516,731 the component of thrust generated in the ring valve gap is carried through the body of the auger to the thrust bearing on the opposite end of the auger. There it is transmitted through the bearing to cause tension to appear in the support arms causing the arms to pull away from the base plate. The reaction force causes the ring valve to transmit its force to the ring valve mounting assembly via the threads. The mounting assembly pushes against the base plate canceling the force applied by the tension in the arms.

In machines such as shown in U.S. Pat. No. 4,303,206, the force follows much the same path in that the force generated in the auger/ring valve gap is transmitted through the body of the auger to the thrust bearing where it is transferred via the thrust bearing housing to the frame. The reaction force on the ring valve is carried through the bone exit can to the sliding block assembly and transferred to the frame. The frame section between the thrust bearing and the sliding block assembly is in tension due to the opposing forces canceling each other.

Because the ring valve is located on the opposite end of the machine from the motor, the frame section between the motor and sliding block on machines of this type must also carry the reaction torque forces generated in the ring valve as the bone passes through. In the present invention, the arms are not required to handle this load because the reaction torque circuit is contained within the ring valve, thrust bearing housing and base plate.

In a machine configuration in which the motor and other parts are mounted on rails as discussed previously, the paths for reaction forces and torques will vary depending on configuration. The important point to be made is that the placement of the ring valve and thrust bearing in the same housing which is located at the motor end of the machine causes the framework to be subjected to fewer and smaller forces than those in prior art machines.

While a preferred embodiment of the invention has been described using specific terms, such description is for illustrative purposes only, and it is to be understood that changes and variations may be made without departing from the spirit or scope of the following claims.

What is claimed is:

1. Apparatus which includes a feed can having an entry end through which material passes, an exit end from which said material exits, an auger for conveying said material from said entry end to said exit end, a drive motor having a drive motor shaft for connection to a first end of said auger for rotating an auger shaft, and a bearing housing supporting said auger shaft at a second end of said auger, wherein said apparatus comprises:
   a motor coupling housing receiving said first end of said auger;
   coupling means for coupling said drive motor shaft and said auger together so that said drive motor shaft and auger move axially relative to each other;
   first connecting means connecting said coupling means to said auger;
   second connecting means connecting said drive motor shaft and said coupling means; and
   a bearing housing carried by an end plate of said feed can which receives said first end of said auger shaft and accommodates relative axial movement of said auger.

2. The apparatus of claim 1 wherein said coupling means includes an axially fixed coupling element having a hollow interior which receives said drive motor shaft; and said drive motor shaft floats axially relative to said coupling element.

3. The apparatus of claim 2 including biasing means carried between said coupling element and said drive motor shaft urging said drive motor away from said coupling element.

4. The apparatus of claim 3 wherein said biasing means includes a compression spring carried between said drive motor shaft and said coupling element.

5. The apparatus of claim 4 including an adjustment means for adjusting a spring force exerted by said compression spring.

6. The apparatus of claim 5 wherein said adjustment means includes a threaded bore in an end of said drive motor shaft and a follower threadably received in drive shaft bore which engages said compression spring.

7. The apparatus of claim 6 wherein said follower includes a manually operated follower having a drive socket for adjusting said follower.

8. The apparatus of claim 3 including adjustment means for adjusting the force of said biasing means.

9. The apparatus of claim 1 wherein said first connecting means includes a non-threaded twist lock means for locking said auger and drive motor shaft together in a drive connection with a twisting force in a first direction and for releasing said drive motor shaft and auger from said drive connection with a twisting force in an opposite direction.

10. The apparatus of claim 9 wherein said twist lock connection means includes a connecting pin carried by said coupling element and a spiral groove formed in said first end of said auger which receives said connecting pin and twists into locking connection with said coupling element.

11. The apparatus of claim 10 wherein said first end of said auger includes a hollow bore, and said coupling element is slidably received in said bore.

12. The apparatus of claim 1 wherein said second connecting means includes a slidable connector means for connecting said motor drive shaft and said coupling element together in a manner that said motor drive shaft and said coupling element may slide relative to each other.

13. The apparatus of claim 12 wherein said slidable connector means includes a first keyway formed in said drive motor shaft, a second keyway formed in said coupling element, and a key interconnecting said first and second keyways.

14. The apparatus of claim 1 including a bearing housing having at least one self aligning bearing having an inner race carried by said auger shaft and an outer race carried by said bearing housing, and sealing means disposed between said bearing and a feed can end plate.

15. The apparatus of claim 14 wherein said bearing housing comprises two self-aligning bearings which support a free end of said auger shaft for properly aligning said auger shaft in said feed can and motor coupling.

16. The apparatus of claim 1 including a frame for carrying said auger feed can, bearing housing, motor coupling housing, and drive motor;
   said frame comprising at least two rail means;
   a plurality of mounting plates for mounting said housings to said rail means;
   a plurality of T-bar assemblies for mounting said mounting plates to said frame which include T-slots formed in said rail means; and
   a plurality of lower T-blocks having a widened base received in said T-slots, and means for attaching said mounting plates to said T-blocks so that said mounting plates are slidably mounted to said rail means.

17. The apparatus of claim 16 including:
   upper T-blocks having a widened base secured to said mounting plates and a narrow stem; and
   lower T-blocks having their widened bases carried in said T-slots and a narrow stem which mates with said narrow stems of said upper T-blocks whereby an attachment bolt may extend through said mounting plates, upper T-blocks, and lower T-blocks to slidably mount said mounting plates.

18. An improved motor coupling and bearing apparatus for an auger machine which includes an auger housing and an auger for conveying material through said housing, a drive motor having a drive motor shaft for connection to a first end of said auger for rotating said auger, and a bearing housing supporting a second end of said auger, wherein said apparatus comprises:
   a motor coupling housing receiving said first end of said auger;
   an axially fixed coupling means for coupling said drive motor shaft and said auger together so that said drive motor shaft and auger move axially relative to each other; and
   a thrust bearing including an inner race carried by said coupling means and an outer race surrounded by said motor coupling housing for resisting axial thrust.

19. The apparatus of claim 18 including a slidable connector means connecting said coupling means and a drive shaft of said drive motor.

20. The apparatus of claim 19 including a first seal carried between said motor coupling housing and said coupling means on a first side of said thrust bearing and a second seal carried between said motor coupling housing and said coupling means on a second side of said thrust bearing.

21. The apparatus of claim 18 including biasing means biasing said thrust bearing via said coupling means for pre-loading of said thrust bearing.

22. The apparatus of claim 21 wherein said biasing means includes biasing means carried between coupling means and drive motor shaft urging said drive motor away from said coupling means.

23. The apparatus of claim 22 including adjustment means for adjusting the force of said biasing means.

24. The apparatus of claim 18 including a non-threaded twist lock means for locking said auger and a drive motor shaft together in a drive connection with a twisting force in a first direction and for releasing said drive motor shaft and auger from said drive connection with a twisting force in an opposite direction.

25. The apparatus of claim 18 wherein said coupling means includes a coupling means having a hollow interior which receives said drive motor shaft; and said drive motor shaft floats axially relative to said coupling means.

26. A meat deboning apparatus of the type which includes a feed can having an entry end, a meat deboning sieve through which meat product passes generally radially for separation from bone material, an exit end from which said bone material exits, an auger for conveying said meat and bone material from said entry end to said exit end, a drive motor for connection to a first end of an auger shaft of said auger for rotating said auger, and a bearing housing supporting said auger shaft at a second end of said auger, wherein said apparatus comprises:
a conveying auger extending axially of said feed can and deboning sieve, and means for mounting said auger for rotation within said feed can and sieve;
drive means for rotating said auger within said feed can and sieve; and
coupling means for coupling said drive means and said auger drivingly together in a manner that said auger moves axially with respect to said drive means during operation and rotation of said auger to accommodate thermal expansion.

27. The apparatus of claim 26 wherein said drive means comprises:
an electric motor having a drive shaft;
said drive shaft extending co-axially of said auger; and
connecting means drivingly connecting said coupling means rotatably with said drive shaft and said auger so that said drive shaft rotates said auger.

28. The deboning arrangement of claim 27 wherein a locking pin drivingly connects said coupling means and said auger.

29. The deboning arrangement of claim 27 wherein a locking key drivingly connects said drive shaft and said coupling means while at the same time allowing axial mobility of said motor shaft.

30. The apparatus of claim 27 wherein said coupling means comprises:
a coupling element freely received over an end of said drive shaft for relative axial movement; and
connecting means connecting said drive shaft and coupling element together in rotation.

31. The apparatus of claim 30 wherein said connecting means includes a connecting pin carried by said coupling element and a spiral groove formed in a first end of said auger which receives said connecting pin and twists to locking connection with said coupling element.

32. The apparatus of claim 31 wherein said spiral groove includes a terminal groove portion which is general parallel to a front end of said auger which receives said connecting pin.

33. The apparatus of claim 32 wherein said spiral groove includes a generally straight groove portion at said first end of said auger shaft, and an intermediate groove portion which connects said first groove portion with said terminal groove portion.

34. The apparatus of claim 33 including a widened tapered portion formed in said first end of said auger shaft which leads into said straight groove portion.

35. The apparatus of claim 26 including a frame for carrying said auger bearing housing, bearing housing, motor coupling housing, and motor;
said frame comprising at least two rail means;
a plurality of mounting plates for mounting said housings to said rail means;
a plurality of lower T-bar assemblies for mounting plates to said frame which include T-slots formed in said rail means; and
a plurality of T-blocks having a widened base received in said T-slots, and means for attaching said mounting plates to said T-blocks so that said mounting plates are slidably mounted to said real means.

36. The apparatus of claim 35 including:
upper T-blocks having a widened base secured to said mounting plates and a narrow stem; and
lower T-blocks having their widened bases carried in said T-slots and a narrow stem which mates with said narrow stems of said upper T-blocks whereby an attachment bolt may extend through said mounting plates, upper T-blocks, and lower T-blocks to slidably mount said mounting plates.

37. The apparatus of claim 30 including:
thrust bearing means for resisting axial forces carried between coupling element and a motor shaft housing; and
biasing means applied through said coupling element for applying a pre-loading force on said thrust bearing means.

38. The apparatus of claim 37 wherein said thrust bearing means includes:
an inner bearing race surrounding said coupling element and an outer bearing race surrounded by said motor shaft housing.

39. The apparatus of claim 1 including a throttle valve ring carried by said motor coupling housing defining a throttle gap between said valve ring and said auger for throttling the exiting of said material.

40. The apparatus of claim 18 including a throttle valve ring carried by said motor coupling housing defining a throttle gap between said valve ring and said auger for throttling the exiting of said material.

* * * * *